Aug. 25, 1959  D. R. BOOMER ET AL  2,901,339
CONTINUOUS PROCESS FOR CONVERSION OF LIGNO-CELLULOSE MATERIALS
Filed Dec. 27, 1955
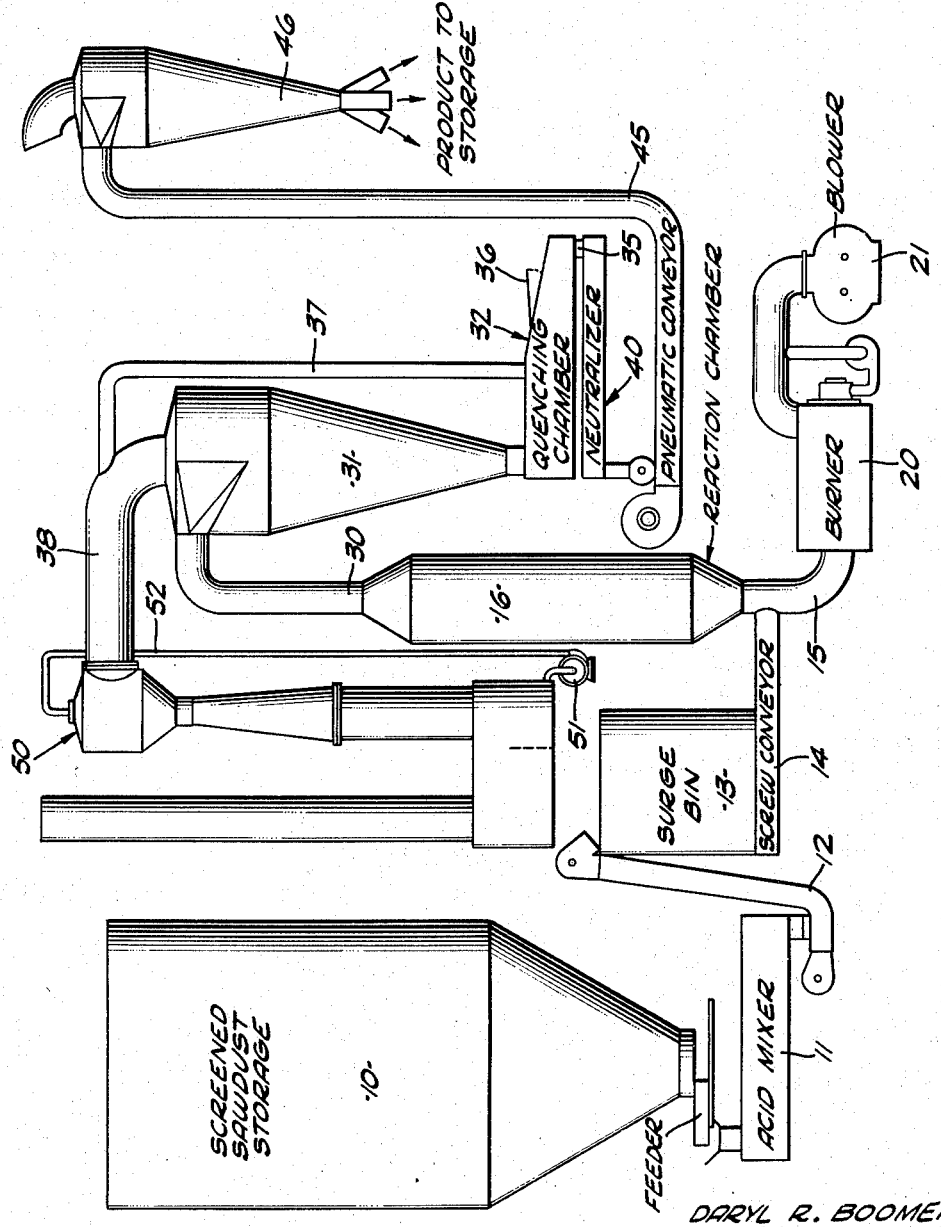
DARYL R. BOOMER
EDWARD T. CLAPPERTON
RUSSELL C. PHILLIPS
INVENTORS
BY
ATTORNEYS

2,901,339

CONTINUOUS PROCESS FOR CONVERSION OF LIGNO-CELLULOSE MATERIALS

Daryl R. Boomer and Edward T. Clapperton, Oak Ridge, Oreg., and Russell C. Phillips, Menlo Park, Calif., assignors to Wooduse, Inc., San Francisco, Calif., a corporation of California Application December 27, 1955, Serial No. 555,449

5 Claims. (Cl. 71—23)

This invention relates to the treatment of ligno-cellulose materials and has particular reference to a continuous process for the preparation of agricultural nutrient carriers and soil conditioning agents from ligneous and cellulosic wastes.

It has heretofore been proposed to use ligno-cellulose waste materials, such as sawdust, bagasse and the like, as agricultural nutrient carriers and as soil conditioning agents similar to humus. However, it is known that these materials as such are not suitable for use in soils for the reason that the cellulosic content thereof supports the growth of bacteria and fungi with resultant depletion of the nitrogen and other fertilizer materials present in the soil. It is also known that the nitrogen-depleting tendencies of ligno-cellulose materials may be partially or completely overcome by heating the materials in the presence of a mineral acid to convert part or substantially all of the cellulosic fraction to an unreactive or inert form which will not support any substantial bacterial or fungicidal action. However, some difficulties have been encountered in carrying out such processes on a commercial scale, due to problems of controlling the operations to produce a satisfactory product. Moreover, it has heretofore been necessary to utilize raw materials having substantially uniform particle sizes in order to produce a uniform product. Additionally, the processes heretofore proposed are not wholly satisfactory from an economic standpoint in that they require substantial capital investments for equipment and relatively high costs of operation. One of the principal objects of this invention is, therefore, to provide a novel process for the treatment of ligno-cellulose materials, which is not subject to the above and other disadvantages of the processes heretofore proposed.

More specifically, an important object of this invention is to provide a novel process for the treatment of ligno-cellulose materials to produce a uniform product suitable for use as an agricultural nutrient carrier and/or as a soil conditioning agent.

Another object of this invention is to provide a novel continuous process for the conversion of ligno-cellulose materials into suitable agricultural nutrient carriers and/or soil conditioning agents.

Another object of this invention is to provide a process for the conversion of ligno-cellulose materials into uniform products utilizing starting materials of varying particle size such as, for example, mill-run sawdust.

Still another object of this invention is to provide a continuous process for the treatment of ligno-cellulose waste materials which requires only relatively simple and inexpensive equipment, and which is relatively inexpensive to operate.

Other objects and advantages of this invention it is believed will be readily apparent from the following description of a preferred embodiment thereof when read in connection with the accompanying drawings.

In the drawings the single figure is a diagrammatic view illustrating the apparatus utilized in carrying out the process of this invention.

Briefly, in carrying out the process of this invention the ligno-cellulose material in comminuted form is mixed with an aqueous solution of a mineral acid such as sulfuric acid, phosphoric acid, hydrochloric acid or mixtures thereof, and the mixture conveyed, in fluid form, through a reaction zone wherein the desired conversion takes place. In this process, the mixture is conveyed through the reaction chamber by means of a stream of hot gases, the gases also functioning as the heat transfer medium to bring the material to the desired reaction temperature. These gases, mixed with gaseous and volatilized reaction products, are separated from the solid, comminuted conversion product and preferably scrubbed with water to remove valuable constituents thereof such as acetone, furfural, etc., which may be recovered as such or utilized as fuel in the process. The solid product is quenched, preferably with water, to stop the reaction, and then preferably treated with ammonia and/or other desirable food supplements. This process is particularly advantageous in that the apparatus required is inexpensive to install and operate, the thermal efficiency is high, and it is capable of producing a uniform product, i.e., a particulate product wherein each particle is uniformly treated, even though the particle sizes of the raw material vary over a wide range.

Referring now to the drawings, the process of this invention is carried out on a large-scale basis preferably by installing the apparatus shown adjacent a saw mill. The waste sawdust from the mill is preferably screened, only for the purpose of removing minute dust particles and relatively large slivers, and stored in a hopper 10. The sawdust is fed from this hopper in measured amounts to an acid mixer 11 wherein the acid is added through spray heads (not shown). The mixer includes a pair of paddle conveyor screws (not shown) mounted for rotation in a double-width trough, the screws rotating in opposite directions for simultaneous mixing and conveying. The acid is preferably relatively dilute, i.e., of the order of 25% by weight, but the acid strength may vary from about 10 to about 80% by weight. Roughly 2.0% of acid, on a dry basis, based on the dry weight of the sawdust is utilized, but this may vary from about 1.5 to about 10%.

The acid-treated sawdust is raised from the mixer 11 by means of an elevator conveyor 12 to a surge bin 13 from whence it is delivered through a screw conveyor 14 to the conduit 15 leading to the reaction chamber 16. The acid-treated sawdust is conveyed to and through the cylindrical reaction chamber by means of combustion gases from a fuel burner 20, the gases being forced into the conduit 15 by means of a positive pressure metering blower 21. The velocity and temperature of the combustion gases, the rate of feed of the sawdust-acid mixture and the dimensions of the reaction chamber are so designed as to result in subjecting the sawdust particles to the desired reaction temperature and time during their residence in the reaction chamber. That is, the velocity of the gases is sufficient to convey the acid-sawdust mixture upwardly through the conduit 15 and, at a lesser velocity, through the reaction chamber 16. When so conveyed, the particles are in the fluid form in the sense that they behave as a fluid stream of individual, as opposed to massed and mutually contacting, particles.

The ultimate temperature of the particles themselves varies, depending primarily upon the desired degree of conversion of the celluluose, and the specific type of raw material involved. Moreover, the reaction is exothermic and care must be taken to avoid excessive heating which would result in undue charring or excessive decomposition of the material. Generally, the reaction temperature of the material itself is maintained between about 350° and about 600° F.

The reacted material from the reaction chamber 16 is conveyed by the gas stream upwardly through the discharge conduit 30 into the cyclone separator 31. The particulate reacted material discharges downwardly from the cyclone into a quenching chamber 32. This chamber includes a paddle type screw conveyor (not shown) and spray heads (not shown). Cold water is here added to the hot reacted material to lower the temperature thereof sufficiently to quench any further reaction. Generally, the amount of water required for this purpose is approximately 10% by weight of the reacted (and dried) material. A major portion of the water is absorbed in the material. The screw conveyor functions both to mix the water and reacted material and to convey the mixture longitudinally through the quenching chamber for discharge through the down pipe 35. The quenching chamber has a damper 36 and a stack 37 extending upwardly therefrom into communication with the exhaust conduit 38 from the cyclone 31 so that any vapors given off from the quenching operation will be swept away. The damper 36 also serves to prevent any suction from being applied to the top of the cyclone.

The down pipe 35 connects with a neutralizer chamber 40 which also includes a paddle type screw conveyor (not shown) and spray heads (not shown), wherein aqueous (28%) ammonia is added to the quenched material. Anhydrous ammonia may be used, if desired. The ammonia neutralizes any residual acid left in the quenched material and, additionally, provides the finished product with soil nutrient in the form of nitrogen. Preferably the ammonia is used in excess over that required for the neutralization. Other nutrients such as potassium, phosphorus and trace elements may be added to the material in the neutralizer chamber if desired.

The finished soil conditioner product is moved from the chamber 40 by means of a pneumatic conveyor 45 to a product silo 46.

The mixture of gases from the cyclone separator 31 discharges through the exhaust conduit 38 into a fume scrubber 50 wherein the volatiles in the gases are condensed and preferably recovered for use as fuel in the burner 20. The volatiles comprise acetone, furfural and other organic compounds which may be recovered as such if desired. Water is utilized as a scrubbing medium, a pump 51 and return line 52 being provided for recirculation of a portion of the aqueous scrubbing medium which becomes a solution of the volatiles with continued operation.

From the above description it will be understood that a continuous process for the treatment of ligno-cellulose materials such as sawdust has been provided. The apparatus required is relatively inexpensive and is adapted to be operated with a minimum of expense. Green sawdust, with or without previous air drying, may be used, and the sawdust is dried, as well as subjected to conversion of the cellulose, in the reaction chamber. Inasmuch as some of the exothermic heat generated during the conversion is utilized for the drying of the material, high thermal efficiency is obtained. Control of the degree of conversion is obtained by controlling only the velocity of the combustion gases flowing through the reaction chamber, because the statistical residence time of solids in the reactor is a function of the gas velocity. A particularly important feature of the invention resides in the fact that, due to the fluid-form system utilized in this process, a uniform product is obtained even though the raw material is composed of widely varied particle sizes. The residence time of a fluid-form solid in the reactor is related to the cross-sectional area of the particle, so the smaller particles are held in the hot gas stream for a shorter time than the larger particles. However, the smaller particles, having more surface per unit of weight, absorb a greater concentration of acid during the spraying and mixing operation and are thus more reactive than the larger particles. Since these small, reactive particles are conveyed more rapidly through the reactor than the larger particles containing lower acid concentrations, the degree of conversion obtained with both the small and large particles is essentially equivalent. The unique combination of these factors in the process described results in a uniformly reacted product.

The following is a specific example of process conditions utilized in carrying out the process of this invention in pilot plant scale apparatus wherein the reaction chamber comprised an expanded section of insulated piping 5 feet high having a diameter of 8.13 inches:

| | |
|---|---|
| Ligno-cellulose material | Fir sawdust. |
| Sawdust particle size range | +5—24 mesh. |
| Acid type | Mixture of 60% $H_3PO_4$, 40% $H_2SO_4$. |
| Acid proportion | 2%, based on dry weight of sawdust. |
| Moisture content of treated sawdust | 35% by weight. |
| Air rate to burner | 9.2 lb./min. |
| Feed rate to reactor | 2.65 lb./min. |
| Temperature before feed | 1125° F. |
| Temperature bottom reactor | 900° F. |
| Temperature top reactor | 775° F. |
| Temperature into cyclone | 595° F. |
| Temperature solids from cyclone | 380° F. |
| Product weight | 1.38 lbs./min. |
| Yield, dry basis | 81%. |
| Properties of product: | |
| pH | 1.75. |
| Fixed carbon | 35.2%. |
| Volatile | 64.1%. |
| Ash | 0.72%. |

The above product is preferably treated with aqueous ammonia to bring up the pH to about 7.

In addition to fir sawdust, the process of this invention has been applied to the treatment of other ligno-cellulose materials such as redwood and bagasse, and is applicable to other varieties of wood, waste coffee grounds from soluble coffee manufacture, etc. Plant growth tests of the product show it to be an effective nutrient carrier and that it has promise as a soil conditioning agent. It appears to be particularly efficacious in that it releases nitrogen to the soil slowly during the growing season.

Having fully described our invention, it is to be understood that we do not wish to be limited to the details set forth, but our invention is of the full scope of the appended claims.

We claim:

1. A continuous process for the conversion of particulate ligno-cellulose materials ranging from relatively small to relatively large sizes into lignin-like substances, which comprises the steps of mixing the particles with at least one mineral acid, feeding the mixture into a flowing stream of hot gases, conveying said particles in suspension in said hot gases upwardly through a vertical reaction zone, controlling the velocity of the hot gases through such zone so that small particles are carried through said zone by the hot gases at a faster rate than the large particles and substantially uniform chemical conversion of the large and small particles to a lignin-like product substantially inert to bacterial and fungal action is obtained, the temperature of such gases being sufficiently high to effect such chemical conversion by said acid, and then separating the product thus formed from the gas stream.

2. A continuous process for the conversion of particulate ligno-cellulose materials ranging from relatively small to relatively large sizes into lignin-like substances which comprises the steps of mixing the particles with at least one mineral acid, feeding the mixture into a flowing stream of hot gases, conveying said particles in suspension in said hot gases upwardly through a vertical reaction zone, controlling the velocity of the hot gases through such zone so that small particles are carried through said zone by the hot gases at a faster rate than the large particles and substantially uniform chemical conversion of the large and small particles to a lignin-like product substantially inert to bacterial and fungal action is obtained, the temperature of such gases being sufficiently high to effect such chemical conversion by said acid, then separating the product thus formed from the gas stream, quenching said product with water, and neutralizing the acid remaining in said product.

3. A continuous process for the conversion of particulate ligno-cellulose materials ranging from relatively small to relatively large sizes into lignin-like substances which comprises the steps of mixing the particles with from about 1.5 to about 10% by weight on a dry basis of at least one mineral acid, feeding the mixture into a flowing stream of hot gases, conveying said particles in suspension in said hot gases upwardly through a vertical reaction zone, controlling the velocity of the hot gases through such zone so that small particles are carried through said zone by the hot gases at a faster rate than the large particles and substantially uniform chemical conversion of the large and small particles to a lignin-like product substantially inert to bacterial and fungal action is obtained, the temperature of such gases being sufficiently high to effect such chemical conversion by said acid, and then separating the product thus formed from the gas stream.

4. A continuous process for the conversion of the particulate ligno-cellulose materials ranging from relatively small the relatively large sizes into lignin-like substances which comprises the steps of mixing the particles with at least one mineral acid, feeding the mixture into a flowing stream of hot gases, conveying said particles in suspension in said hot gases upwardly through a vertical reaction zone, controlling the velocity of the hot gases through said zone so that small particles are carried through said zone by the hot gases at a faster rate than the large particles and substantially uniform chemical conversion of the large and small particles to a lignin-like product substantially inert to bacterial and fungal action is obtained, the temperature of said gases being sufficiently high to heat the particles to a temperature between about 350 and 600° F. to effect such chemical conversion by said acid, and then separating the product thus formed from the gas stream.

5. A continuous process for the conversion of particulate ligno-cellulose materials ranging from relatively small to relatively large sizes into lignin-like substances which comprises the steps of mixing the particles with from about 1.5 to about 10% by weight on a dry basis of at least one mineral acid, feeding the mixture into a flowing stream of hot gases, conveying said particles in suspension in said hot gases upwardly through a vertical reaction zone, controlling the velocity of the hot gases through said zone so that small particles are carried through said zone by the hot gases at a faster rate than the large particles and substantially uniform chemical conversion of the large and small particles to a lignin-like product substantially inert to bacterial and fungal action is obtained, the temperature of said gases being sufficiently high to heat the particles to a temperature between about 350° and 600° F. to effect such chemical conversion by said acid and then separating the product thus formed from the gas stream.

References Cited in the file of this patent

UNITED STATES PATENTS

| | | |
|---|---|---|
| 1,513,622 | Manning | Oct. 28, 1924 |
| 1,869,949 | Szikla et al. | Aug. 2, 1932 |
| 2,574,027 | Farber | Nov. 6, 1951 |
| 2,714,553 | Bibb et al. | Aug. 2, 1955 |
| 2,735,756 | Farber | Feb. 21, 1956 |